United States Patent [19]

Matsui

[11] Patent Number: 4,903,152

[45] Date of Patent: Feb. 20, 1990

[54] MAGNETIC RECORDING AND REPRODUCING APPARATUS CAPABLE OF CONTAINING A PLURALITY OF RECORDING CASSETTES

[75] Inventor: Akira Matsui, Fukaya, Japan

[73] Assignee: Kabushiki Kaisha Toshiba, Kawasaki, Japan

[21] Appl. No.: 173,118

[22] Filed: Mar. 25, 1988

[30] Foreign Application Priority Data

Mar. 30, 1987 [JP] Japan .................. 62-76635

[51] Int. Cl.$^4$ .............................. G11B 15/68
[52] U.S. Cl. ........................ 360/92; 360/85; 360/96.5
[58] Field of Search .............. 360/92, 85, 91, 95, 360/96.5

[56] References Cited

U.S. PATENT DOCUMENTS 4,471,394  9/1984  Hapke .................. 360/92
4,519,009  5/1985  Bolick, Jr. .................. 360/92

FOREIGN PATENT DOCUMENTS 0013806  6/1980  European Pat. Off. .
3511161  10/1985  Fed. Rep. of Germany .
0284861  12/1986  Japan .................. 360/96.5
0239372  10/1987  Japan .................. 360/92
1346228  2/1974  United Kingdom .
1499320  3/1978  United Kingdom .
1508972  4/1978  United Kingdom .

Primary Examiner—A. J. Heinz
Assistant Examiner—David J. Severin
Attorney, Agent, or Firm—Cushman, Darby & Cushman

[57] ABSTRACT

A video tape recorder includes a cassette housing section for housing two tape cassettes. The housing section has a first stand-by region, a tape loading region, and a second stand-by region which are arranged horizontally. One of the tape cassettes housed in the housing section is transported between the first stand-by region and the tape loading region by a first transportation mechanism, and the other cassette is transported between the tape loading region and the second stand-by region by the mechanism. The tape cassette in the tape loading region is transported between the loading region and a tape drive region situated thereunder by a second transportation mechanism. The tape cassette transported to the drive region is effected recording or reproducing operation by a drive mechanism.

13 Claims, 5 Drawing Sheets

MAGNETIC RECORDING AND REPRODUCING APPARATUS CAPABLE OF CONTAINING A PLURALITY OF RECORDING CASSETTES

BACKGROUNDS OF THE INVENTION

1. Field of the Invention

The present invention relates to a magnetic recording and reproducing apparatus such as a video tape recorder.

2. Description of the Related Art

In continuously performing recording and reproducing operations on a video tape recorder (VTR), using a plurality of tape cassettes therewith, a user manually replaces the tape cassettes while observing the operating condition of the VTR. In changing the cassettes, however, the user must positively stay with the VTR. Thus, it is difficult for the VTR to automatically perform the so-called timer recording or unattended recording.

Accordingly, there has recently been developed an automatic cassette changer which is adapted to contain a plurality of tape cassettes at a time, and can feed them one after another to the VTR. With use of such an autochanger together with the VTR, the timer recording or unattended recording can be effected in excess of the capacity of one tape cassette as the cassettes are changed automatically.

When using the aforesaid autochanger for continuous recording or playback operations, however, the tape cassettes can be replaced only in one direction. More specifically, once a tape cassette undergoes a recording or reproducing operation in the VTR, it is bound to be discharged from the VTR without returning to the autochanger. Once it is discharged, the tape cassette cannot be automatically loaded again into the VTR. Thus, the service modes of the VTR are somewhat restricted. If a plurality of tape cassettes are expected to be used for repeated alternate playback operations, therefore, they must be replaced manually, just as in the conventional arrangement. As a result, the replacement work becomes troublesome.

If an autochanger is attached to the VTR, moreover, the whole apparatus inevitably becomes too bulky.

SUMMARY OF THE INVENTION

The present invention has been contrived in consideration of these circumstances, and its object is to provide a compact magnetic recording and reproducing apparatus, in which a plurality of recording media can be automatically subjected to recording and reproducing in various modes.

In order to achieve the above object, an apparatus according to an aspect of the present invention comprises a cassette housing section including a first stand-by region, a tape loading region, and a second stand-by region arranged horizontally, whereby two tape cassettes can be located in the housing section, in a horizontal plane; a first transportation mechanism for transporting one of the tape cassettes in the cassette housing section between the first stand-by region and the tape loading region, and transporting the other tape cassette between the tape loading region and the second stand-by region; a tape drive region adjacent to the tape loading region; a second transportation mechanism for transporting the tape cassette in the tape loading region between the tape loading region and the tape drive region; and drive means for driving the tape cassette transported in the tape drive region.

An apparatus according to another aspect of the present invention comprises a housing section including a tape loading region and capable of housing two tape cassettes in a horizontal plane; first transportation means for selectively transporting one of the tape cassettes in the housing section to the tape loading region; second transportation means for transporting the tape cassette in the tape loading region between the tape loading region and a tape drive region situated thereunder; and drive means for effecting recording and reproducing with use of the tape cassette situated in the tape drive region.

BRIEF DESCRIPTION OF THE DRAWINGS

FIGS. 1 to 8 show a video tape recorder according to an embodiment of the present invention, in which:

FIG. 1 is a perspective view schematically showing an outline of the VTR;

FIG. 2 is a sectional view taken along line II—II of FIG. 1; and

FIGS. 3 to 8 are diagrams schematically showing different operating states of the VTR.

DETAILED DESCRIPTION OF THE PREFERRED EMBODIMENT

An embodiment of the present invention will now be described in detail with reference to the accompanying drawing.

Figure 1:
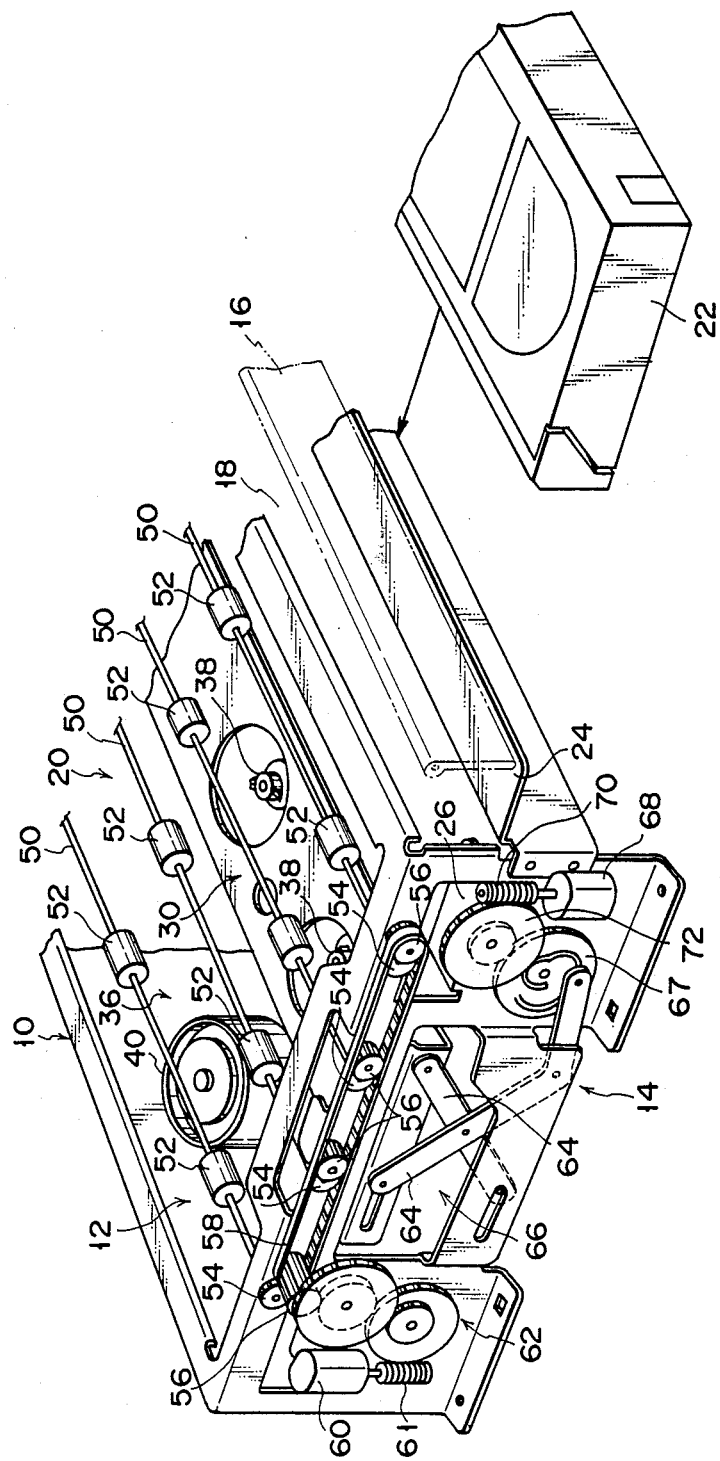

FIG. 1 shows the internal structure of a VTR according to an embodiment of the present invention. The VTR comprises bracket 10, which is fitted with transportation mechanism 12 and lift mechanism 14 as first and second transportation means (mentioned later), respectively.

Figure 2:
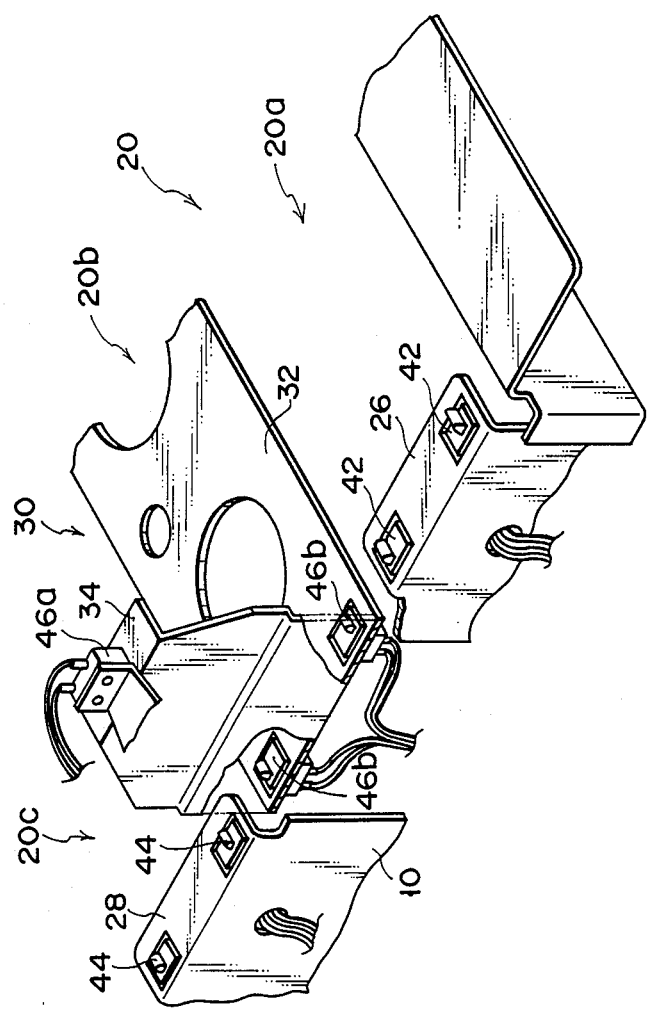
Figure 3:
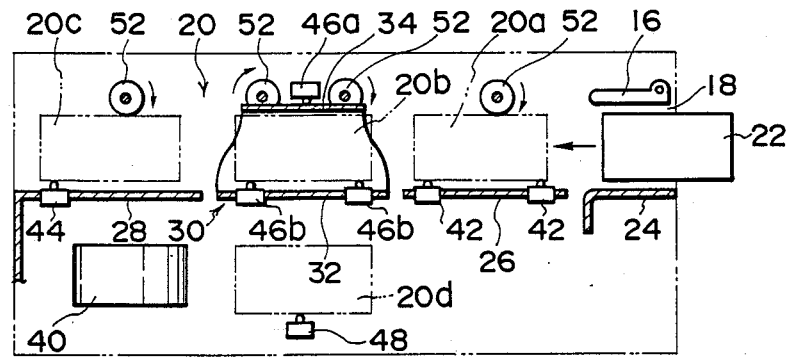

As is shown in FIGS. 1 to 3, the front wall of bracket 10 is formed with inlet opening 18 which is opened and closed by means of shutter 16. Adjoining opening 18, housing section 20 is formed inside bracket 10. Tape cassette 22 when inserted through opening 18 into the VTR is housed in housing section 20. Section 20 includes first stand-by region 20a, tape loading region 20b, and second stand-by region 20c, which are arranged horizontally from the opening side toward the inner part of bracket 10, in the order name. Each of these regions is large enough to contain one tape cassette. Thus, housing section 20 can contain two tape cassettes at a time.

Bracket 10 includes first guide plate 24, extending horizontally from its front wall to the region near inlet opening 18, and second and third guide plates 26 and 28 projecting from each side wall of the bracket into the inside thereof. Guide plates 24, 26 and 28 are situated within one and the same horizontal plane. Second guide plates 26 are located so as to support and guide tape cassette 22 which is situated in first standby region 20a. Third guide plates 28 are located so as to support and guide the cassette which is situated in second stand-by region 20c. Cassette holder 30 of lift mechanism 14 (mentioned later) can be disposed in tape loading region 20b between first and second stand-by region 20a and 20c. Holder 30 has bottom wall 32 and top wall 34. Bottom wall 32 is adapted to be situated within the same plane as the first to third guide plates when the cassette holder is moved to tape loading region 20b. Top wall 34 is situated at a distance substantially equivalent to the thickness of tape cassette 22 from the bottom wall.

When cassette holder 30 is in tape loading region 20b, tape cassette 22 in housing section 20 is allowed to move between regions 20a, 20b and 20c.

Cassette holder 30 is movable between tape loading region 20b and tape drive region 20d thereunder. Inside bracket 10, moreover, drive mechanism 36 is arranged below housing section 20. Drive mechanism 36 includes a pair of reels 38 arranged in drive region 20d, rotating drum 40 located below second stand-by region 20c, etc. Drive mechanism 36 drives tape cassette 22 transported to tape drive region 20d by cassette holder 30.

As is shown in FIGS. 2 and 3, each second guide plate 26 is provided with a pair of first sensors 42 for detecting the presence of tape cassette 22 in first stand-by region 20a. Each third guide plate 28 is provided with a pair of second sensors 44 for detecting the presence of cassette 22 in second stand-by region 20c. Within tape loading region 20b, one third sensor 46a is located in a position facing top wall 34 of cassette holder 30, while a pair of third sensors 46b are attached to bottom wall 32 of the cassette holder. Third sensors 46a and 46b serve to detect the presence of tape cassette 22 in tape loading region 20b. Further, fourth sensor 48 is provided at the bottom portion of bracket 10. It serves to detect the presence of cassette 22 in tape drive region 20d.

Transportation mechanism 12, which serves to transport tape cassette 22 in housing section 20 between regions 20a, 20b and 20c, includes four drive shafts 50 stretched separately between the opposite side walls of bracket 10. Shafts 50 are situated parallel to one another and within a common horizontal plane. Two of shafts 50 are located individually in first and second stand-by regions 20a and 20c, and the remaining two are located in tape loading region 20b. A plurality of rubber rollers 52 are fixed to each shaft 50. These rollers are adapted to engage the top surface of tape cassette 22 inserted in housing section 20. One end of each shaft 50 projects outward through the one side wall of bracket 10, and driven gear 54 is mounted on the projecting end of the shaft. Gears 54 are in mesh with their corresponding driving gears 56 attached to the one side wall of bracket 10. Toothed endless belt 58 is passed between and around these four driving gears. Transfer motor 60 is fixed to the one side wall of bracket 10. The driving force of motor 60 is transmitted to one of the driving gears 56 through worm gear 61 fixed to the shaft of motor 60 and gear train 62 mounted on bracket 10. Thus, as motor 60 is driven, rollers 52 rotate integrally with their corresponding shafts 50, and tape cassette 22 in housing section 20 is transported between first and second stand-by regions 20a and 20c by means of rollers 52.

Lift mechanism 14 includes cassette holder 30 for holding tape cassette 22 in position, as mentioned before. Holder 30 is supported on bracket 10 so that it can be moved vertically between tape loading region 20b and tape drive region 20d by means of cross link 66, which is composed of a pair of arms 64. One end of one arm 64 is in engagement with cam gear 67 which is mounted on the one side wall of bracket 10. Cam gear 67 is rotated by means of lift motor 68 which is fixed to the one side wall of bracket 10. The driving force of motor 68 is transmitted to gear 67 through worm gear 70, which is mounted on the shaft of motor 68, and gear 72 which is mounted on bracket 10. Thus, when motor 68 is driven with tape cassette 22 held in cassette holder 30, cassette 22, along with holder 30, is moved up and down between tape loading region 20b and tape drive region 20d.

The following is a description of the operation of the VTR constructed in this manner.

First, recording and reproducing operations using only one tape cassette will be explained.

Figure 4:
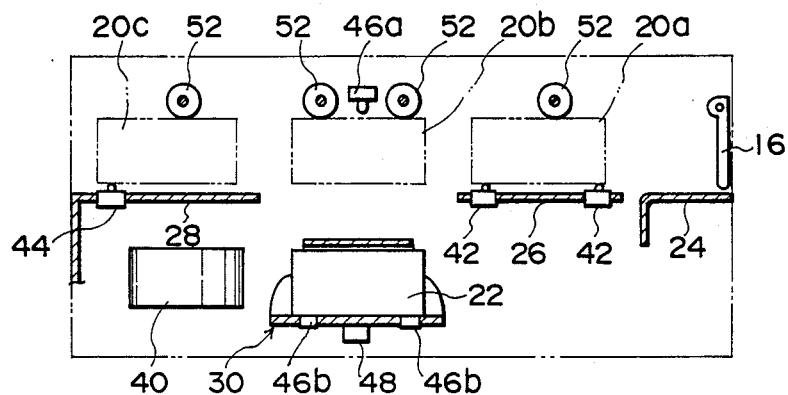

When tape cassette 22 is inserted into housing section 20 through inlet opening 18, as is shown in FIG. 3, transfer motor 60 is rotated in the forward direction, so that drive shafts 50 and rubber rollers 52 are rotated in the clockwise direction of FIG. 3. Before tape cassette 22 is inserted into the VTR, cassette holder 30 is held in tape loading region 20b. On receiving the driving force from rollers 52, cassette 22 is fed through first stand-by region 20a into holder 30 in tape loading region 20b. When paired third sensors 46b attached to holder 30 are switched on by cassette 22, transfer motor 60 is stopped, and lift motor 68 of lift mechanism 14 is rotated forward. As a result, cassette holder 30 with cassette 22 descends from tape loading region 20b to tape drive region 20d, as is shown in FIG. 4. Thereupon, fourth sensor 48 is switched on by holder 30, so that lift motor 68 is stopped. Thus, the loading of tape cassette 22 is finished.

If a playback or recording mode select switch (not shown) of the VTR is turned on, in this state, a magnetic tape in tape cassette 22 is wound around rotating drum 40 by means of tape drive mechanism 36, whereupon the tape is subjected to a playback or recording operation. If a stop mode is selected after the end of the playback or recording operation, the magnetic tape is drawn back into cassette 22 by tape drive mechanism 36.

If an eject switch (not shown) of the VTR is turned on, lift motor 68 is rotated reversely, so that cassette holder 30, along with tape cassette 22, ascends from tape drive region 20d to tape loading region 20b. Thereupon, third sensor 46a is switched on by top wall 34 of holder 30. In response to this, lift motor 68 is stopped, and transfer motor 60 of transportation mechanism 12 is rotated reversely. Accordingly, rubber rollers 52 are rotated in the counterclockwise direction, so that tape cassette 22 in tape loading region 20b is discharged from the VTR via first stand-by region 20a and inlet opening 18, by rollers 52.

Recording and playback operations using two tape cassettes will now be explained.

Figure 5:
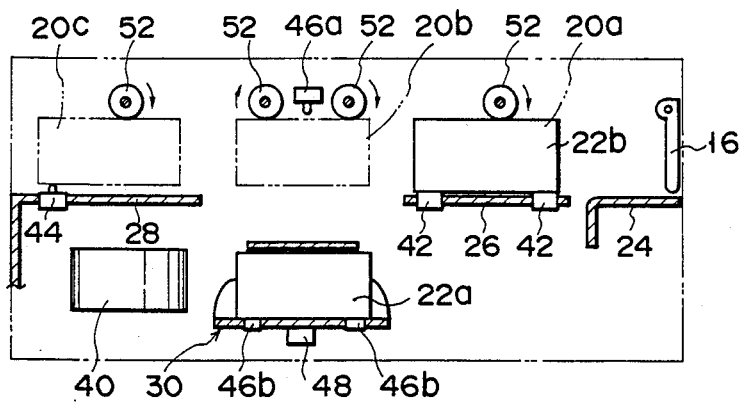
Figure 6:
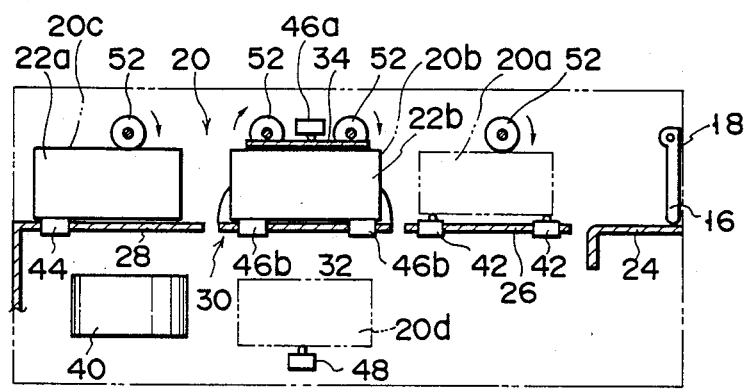

First tape cassette 22a is first inserted into the VTR and then set in tape drive region 20d, as is shown in FIG. 4, after undergoing the same processes as aforesaid. In this state, if second tape cassette 22b is inserted into housing section 20 through inlet opening 18, as is shown FIG. 5, transfer motor 60 of transportation mechanism 12 is rotated forward, so that the second cassette is transported to first stand-by region 20a by rollers 52. Thereupon, first sensors 42 are switched on by second cassette 22b, so that transfer motor 60 is stopped, and lift motor 68 of lift mechanism 14 is rotated reversely. As a result, cassette holder 30, along with first tape cassette 22a therein, ascends from tape drive region 20d to tape loading region 20b, thereby switching third sensor 46a on. In response to this, transfer motor 60 is rotated forward, so that first cassette 22a is transferred from tape loading region 20b to second stand-by region 20c, while second cassette 22b is transferred from first stand-by region 20a to region 20b, as is shown in FIG. 6.

Figure 7:
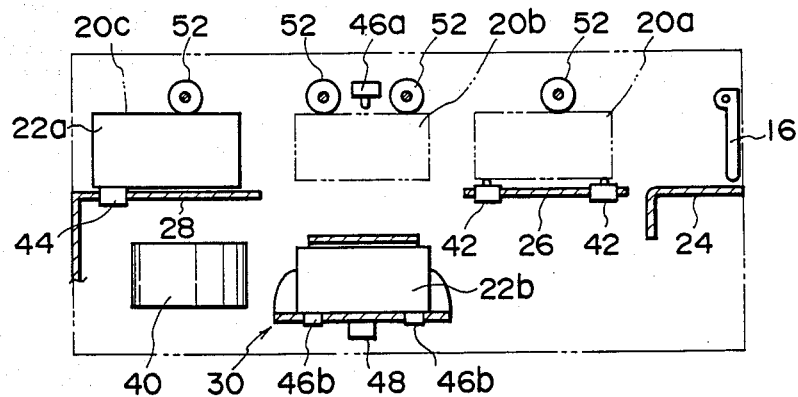

When second and third sensors 44 and 46b are switched on by cassettes 22a and 22b, respectively, transfer motor 60 is stopped, and lift motor 68 is rotated forward. Thereupon, cassette holder 30, holding second tape cassette 22b therein, as is shown in FIG. 7, descends from tape loading region 20b to tape drive region 20d, thereby switching fourth sensor 48 on. In response to this, lift motor 68 is stopped, and second cassette 22b is set in tape driven region 20d. Thus, an initial state, which permits recording and playback operations, is established.

In starting a recording or playback operation for first tape cassette 22a directly after the end of the same operation for second tape cassette 22b, first cassette 22a, instead of second cassette 22b, is set in tape drive region 20d according to the following processes.

Figure 8:
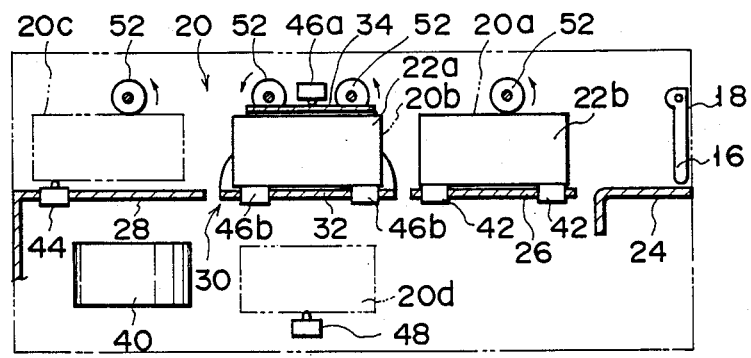

First, lift motor 68 of lift mechanism 14 is rotated reversely, so that cassette holder 30, holding second cassette 22b therein, ascends from tape drive region 20d to tape loading region 20b. When third sensor 46a is switched on by holder 30, lift motor 68 is stopped, and transfer motor 60 of transportation mechanism 12 is rotated reversely. Thereupon, rollers 52 are rotated in the counterclockwise direction, as is shown in FIG. 8, so that first and second cassettes 22a and 22b are transported to tape loading region 20b and first stand-by region 20a, respectively, by rollers 52. Thus, third and first sensors 46b and 42 are switched on by cassettes 22a and 22b, respectively, so that lift mechanism 14 is actuated. As a result, first tape cassette 22a in tape loading region 20b is transferred to and set in tape drive region 20d with the aid of cassette holder 30, as is shown in FIG. 5. In this state, first tape cassette 22a is ready for the recording and playback operations.

In setting second tape cassette 22b, instead of first tape cassette 22a, again in tape drive region 20d, the processes shown in FIGS. 5 to 7 are repeated.

According to the VTR constructed in this manner, two tape cassettes housed in housing section 20 can be set in the tape drive region alternatively and automatically, so that they can be alternately subjected to playback operation, or be successively offered for continuous recording operation. Thus, the VTR is easier to handle, and can provide various service modes. Since the tape cassettes can be automatically changed in the aforesaid manner, moreover, the VTR according to the present invention need not be provided with any such independent autochanger as is required by the prior art VTR. Thus, the apparatus can be prevented from being increased in size. The transportation mechanism and the lift mechanism for the automatic changing of the tape cassettes have substantially the same construction as those of a conventional VTR, in which only one tape cassette can be used for one cycle of recording or playback operation. Therefore, the VTR of the invention need not be provided anew with a separate mechanism for the automatic cassette changing. Furthermore, the second stand-by region is defined by utilizing the region over the tape drive mechanism, especially the space over the rotating drum. Thus, the inside space of the VTR is used effectively, so that the VTR can be reduced in size.

It is to be understood that the present invention is not limited to the embodiment described above, and that various changes and modifications may be effected therein by one skilled in the art without departing from the scope of the invention.

For example, the type and locations of the sensors, as well as the configurations of the transportation mechanism and the lift mechanism, may be changed as required.

What is claimed is:

1. A magnetic recording and reproducing apparatus comprising:
   a cassette housing section including a first stand-by region, a tape loading region, and a second stand-by region linearly arranged in a horizontal direction, whereby two tape cassettes can be housed in the housing section, in a horizontal plane, said housing section having an inlet opening through which tape cassettes are inserted into the housing section and which communicates with one of the first and second stand-by regions;
   a first transportation mechanism for linearly transporting one of the tape cassettes in the cassette housing section between the first stand-by region and the tape loading region, and linearly transporting the other tape cassette between the tape loading region and the second stand-by region;
   a tape drive region defined below the tape loading region;
   a second transportation mechanism for transporting one of the tape cassettes in the cassette housing section between the tape loading region and the tape drive region; and
   drive means for driving any tape cassette transported in the tape drive region.

2. An apparatus according to claim 1, wherein said drive means is disposed below the cassette housing section.

3. An apparatus according to claim 2, wherein said drive means includes a rotating drum disposed below the second stand-by region.

4. An apparatus according to claim 1, wherein said housing section includes a first guide portion for supporting and guiding the tape cassette, situated in the first stand-by region, and a second guide portion for supporting and guiding the tape cassette, situated in the second stand-by region, and said second transportation mechanism includes a cassette holder vertically movable between the tape loading region and the tape drive region, for holding the tape cassette in the tape loading region.

5. An apparatus according to claim 4, wherein said cassette holder has a bottom wall, said bottom wall and said first and second guide portions being adapted to be situated within a horizontal plane when the cassette holder is in the tape loading region.

6. An apparatus according to claim 5, wherein said first transportation mechanism includes a plurality of drive rollers capable of engaging the top surface of the tape cassette in the housing section, a first drive source, and a transmission mechanism for transmitting the driving force from the first drive source to the drive rollers to rotate the rollers.

7. An apparatus according to claim 6, wherein said first transportation mechanism includes a plurality of drive shafts arranged at predetermined intervals, in a direction in which the first stand-by region, the tape loading region, and the second stand-by region are linearly arranged, and extending parallel to one another within a horizontal plane, each of said drive shafts being connected to the transmission mechanism and supporting the drive rollers.

8. An apparatus according to claim 6, which further comprises detecting means including a plurality of sensors disposed in each of the first and second stand-by regions, the tape loading region, and the tape drive region, for detecting the arrival of the tape cassette at each said region.

9. An apparatus according to claim 8, wherein said first drive source of the first transportation mechanism includes a reversible motor operating in response to detection signals from the detecting means.

10. An apparatus according to claim 8, wherein said second transportation mechanism includes a support mechanism supporting the cassette holder for up-and-down motion, a second drive source, and a transmission mechanism for transmitting the driving force from the second drive source to the support mechanism so as to ascend or descend the cassette holder.

11. An apparatus according to claim 10, wherein said second drive source of the second transportation mechanism includes a reversible motor operating in response to detection signals from the detecting means.

12. An apparatus according to claim 8, wherein said detecting means includes a first sensor provided at the first guide portion, for detecting the presence of the tape cassette in the first stand-by region, a second sensor provided at the second guide portion, for detecting the presence of the tape cassette in the second stand-by region, a third sensor attached to the bottom wall of the cassette holder, for detecting the presence of the tape cassette in the tape loading region, and a fourth sensor provided at the tape drive region, for detecting the presence of the tape cassette in the tape drive region.

13. A magnetic recording and reproducing apparatus comprising:
   a cassette housing section including a first stand-by region, a tape loading region, and a second stand-by region arranged horizontally, whereby two tape cassettes can be housed in the housing section in a horizontal plane;
   a first transportation mechanism for transporting one of the tape cassettes in the cassette housing section between the first stand-by region and the tape loading region, and transporting the other tape cassette between the tape loading region and the second stand-by region, said first transportation mechanism including a plurality of drive rollers capable of engaging the top surfaces of the tape cassettes in the housing section, a first drive source, and a transmission mechanism for transmitting the driving force from the first drive source to the drive rollers to rotate the rollers;
   a tape drive region adjacent to the tape loading region;
   a second transportation mechanism for transporting one of the tape cassettes in the cassette housing section between the tape loading region and the tape drive region; and
   drive means for driving any tape cassette transported in the tape drive region.

* * * * *